United States Patent
Colannino et al.

(10) Patent No.: US 9,828,288 B2
(45) Date of Patent: *Nov. 28, 2017

(54) PERFORATED BURNER FOR A ROTARY KILN

(71) Applicant: ClearSign Combustion Corporation, Seattle, WA (US)

(72) Inventors: Joseph Colannino, Bellevue, WA (US); Douglas W. Karkow, Des Moines, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/823,313

(22) Filed: Aug. 11, 2015

(65) Prior Publication Data

US 2016/0046524 A1    Feb. 18, 2016

Related U.S. Application Data

(60) Provisional application No. 62/037,064, filed on Aug. 13, 2014.

(51) Int. Cl.
| | |
|---|---|
| *C04B 7/44* | (2006.01) |
| *F27B 7/10* | (2006.01) |
| *F27B 7/34* | (2006.01) |
| *F27B 7/32* | (2006.01) |

(Continued)

(52) U.S. Cl.
CPC ............... *C04B 7/44* (2013.01); *C01G 23/08* (2013.01); *C04B 7/361* (2013.01); *C04B 7/4438* (2013.01); *C04B 7/4453* (2013.01); *F27B 7/10* (2013.01); *F27B 7/32* (2013.01); *F27B 7/34* (2013.01); *Y02P 40/121* (2015.11)

(58) Field of Classification Search
CPC ..................................... C04B 7/44; F27B 7/10
USPC .......................................................... 44/628
See application file for complete search history.

(56) References Cited

U.S. PATENT DOCUMENTS

| | | |
|---|---|---|
| 2,095,065 A | 10/1937 | Hays |
| 2,604,936 A | 7/1952 | Kaehni et al. |
| 3,416,870 A | 12/1968 | Wright |

(Continued)

FOREIGN PATENT DOCUMENTS

| | | |
|---|---|---|
| EP | 0844434 | 5/1998 |
| EP | 2738460 | 6/2014 |

(Continued)

OTHER PUBLICATIONS

Fric, Thomas F., "Effects of Fuel-Air Unmixedness on NOx Emissions," Sep.-Oct. 1993. Journal of Propulsion and Power, vol. 9, No. 5, pp. 708-711.

(Continued)

*Primary Examiner* — Ellen McAvoy
(74) *Attorney, Agent, or Firm* — Christopher A. Wiklof; Nicholas S. Bromer; Launchpad IP, Inc.

(57) ABSTRACT

A rotary kiln includes a stationary fuel nozzle and a perforated flame holder positioned within an inclined rotating shell. The flame holder includes a plurality of perforations that collectively confine a combustion reaction of the burner to the flame holder to shift most heat transfer from the combustion reaction from radiation heat transfer to convective heat transfer.

18 Claims, 7 Drawing Sheets

(51) Int. Cl.
*C04B 7/36* (2006.01)
*C01G 23/08* (2006.01)

(56) References Cited

U.S. PATENT DOCUMENTS

| | | | |
|---|---|---|---|
| 4,021,188 A | 5/1977 | Yamagishi et al. | |
| 4,081,958 A | 4/1978 | Schelp | |
| 4,397,356 A | 8/1983 | Retallick | |
| 4,408,461 A | 10/1983 | Bruhwiler et al. | |
| 4,588,373 A | 5/1986 | Tonon et al. | |
| 4,643,667 A | 2/1987 | Fleming | |
| 4,673,349 A | 6/1987 | Abe et al. | |
| 4,752,213 A | 6/1988 | Grochowski et al. | |
| 5,235,667 A | 8/1993 | Canfield et al. | |
| 5,326,257 A | 7/1994 | Taylor et al. | |
| 5,441,402 A | 8/1995 | Reuther et al. | |
| 5,511,516 A | 4/1996 | Moore, Jr. et al. | |
| 5,899,686 A | 5/1999 | Carbone et al. | |
| 6,997,701 B2 | 2/2006 | Volkert et al. | |
| 7,360,506 B2 | 4/2008 | Shellenberger et al. | |
| 8,669,198 B2* | 3/2014 | Horne Curimbaba Ferreira | C04B 35/0435 501/108 |
| 9,243,800 B2 | 1/2016 | Goodson et al. | |
| 9,377,190 B2 | 6/2016 | Karkow et al. | |
| 9,388,981 B2 | 7/2016 | Karkow et al. | |
| 9,447,965 B2 | 9/2016 | Karkow et al. | |
| 2004/0081933 A1 | 4/2004 | St. Charles et al. | |
| 2006/0191444 A1* | 8/2006 | Wagner | C04B 7/28 106/739 |
| 2006/0272553 A1* | 12/2006 | Cifuentes | C04B 7/42 106/739 |
| 2008/0268387 A1 | 10/2008 | Saito et al. | |
| 2010/0178219 A1 | 7/2010 | Verykios et al. | |
| 2011/0044868 A1 | 2/2011 | Lee et al. | |
| 2011/0076628 A1 | 3/2011 | Miura et al. | |
| 2011/0194998 A1 | 8/2011 | Kim et al. | |
| 2013/0004902 A1 | 1/2013 | Goodson et al. | |
| 2013/0071794 A1 | 3/2013 | Colannino et al. | |
| 2013/0323661 A1* | 12/2013 | Goodson | F27B 9/00 432/20 |
| 2013/0333279 A1* | 12/2013 | Osler | F27B 7/34 44/607 |
| 2014/0004473 A1* | 1/2014 | Song | F27B 7/08 432/11 |
| 2015/0118629 A1 | 4/2015 | Colannino et al. | |
| 2015/0276217 A1 | 10/2015 | Karkow et al. | |
| 2015/0285491 A1 | 10/2015 | Karkow et al. | |
| 2015/0316261 A1 | 11/2015 | Karkow et al. | |
| 2015/0330625 A1 | 11/2015 | Karkow et al. | |
| 2015/0362177 A1 | 12/2015 | Krichtafovitch et al. | |
| 2015/0362178 A1 | 12/2015 | Karkow et al. | |
| 2015/0369477 A1 | 12/2015 | Karkow et al. | |
| 2016/0003471 A1 | 1/2016 | Karkow et al. | |
| 2016/0018103 A1 | 1/2016 | Karkow et al. | |
| 2016/0025333 A1 | 1/2016 | Karkow et al. | |
| 2016/0025374 A1 | 1/2016 | Karkow et al. | |
| 2016/0025380 A1 | 1/2016 | Karkow et al. | |
| 2016/0091200 A1 | 3/2016 | Colannino et al. | |
| 2016/0230984 A1 | 8/2016 | Colannino et al. | |
| 2016/0238242 A1* | 8/2016 | Karkow | F23M 9/06 |
| 2016/0348899 A1* | 12/2016 | Karkow | F23D 14/145 |
| 2017/0050883 A1* | 2/2017 | Sceats | C04B 7/434 |
| 2017/0051913 A1* | 2/2017 | Colannino | F23C 9/08 |
| 2017/0146232 A1* | 5/2017 | Karkow | F23C 5/06 |
| 2017/0184303 A1* | 6/2017 | Colannino | F23D 14/14 |

FOREIGN PATENT DOCUMENTS

| | | |
|---|---|---|
| JP | 60-073242 | 4/1985 |
| WO | WO 1995/000803 | 1/1995 |
| WO | WO 2015/042615 | 3/2015 |
| WO | WO 2015/054323 | 4/2015 |
| WO | WO 2015/061760 | 4/2015 |
| WO | WO 2015/070188 | 5/2015 |
| WO | WO 2015/112950 | 7/2015 |
| WO | WO 2015/123149 | 8/2015 |
| WO | WO 2015/123381 | 8/2015 |
| WO | WO 2015/123670 | 8/2015 |
| WO | WO 2015/123683 | 8/2015 |
| WO | WO 2015/123694 | 8/2015 |
| WO | WO 2015/123696 | 8/2015 |
| WO | WO 2015/123701 | 8/2015 |
| WO | WO 2016/007564 | 1/2016 |

OTHER PUBLICATIONS

Arnold Schwarzenegger, A Low NOx Porous Ceramics Burner Performance Study, California Energy Commission Public Interest Energy Research Program, Dec. 2007, 5, San Diego State University Foundation.

* cited by examiner (PRIOR ART)

PERFORATED BURNER FOR A ROTARY KILN

CROSS REFERENCE TO RELATED APPLICATIONS

The present application claims priority benefit from U.S. Provisional Patent Application No. 62/037,064, entitled "PERFORATED BURNER FOR A ROTARY KILN", filed Aug. 13, 2014; which, to the extent not inconsistent with the disclosure herein, is incorporated by reference.

BACKGROUND

Rotary kilns, or calciners, are used to cause thermal decomposition, phase transition, or removal of volatile fractions from ores and other solid materials in the presence of air. The most familiar calcine (a word that refers to any product produced by the process) is Portland cement, which is produced from limestone (calcium carbonate) as the decomposition product calcium oxide.

Typically, temperature vs. time should be carefully controlled in rotary kilns to provide sufficient energy without exceeding a melting point of the product. Lime kilns (as Portland cement-producing rotary kilns may be commonly referred to) tend to be somewhat tricky to operate for producing optimum product. Temperatures that are too high or too low, or treatment times that are too long or too short can result in sub-par product that does not yield favorable market demand or price. Operation of rotary kilns may be complicated by variations in co-fired fuels (such as tires) that are introduced into the kilns along with raw materials for producing the product.

What is needed is a technology that can maintain consistent desirable kiln conditions and/or adapt to changing operating conditions, while minimizing undesirable flue gases such as oxides of nitrogen (NOx) and carbon monoxide (CO).

SUMMARY

One embodiment is a rotary kiln including a stationary fuel nozzle, a perforated flame holder spaced a selected distance from the stationary nozzle, and a rotating inclined kiln shell rotating around the fuel nozzle and the perforated flame holder. The perforated flame holder includes an input surface facing the fuel nozzle, an output surface, and a plurality of perforations extending between the input and output surfaces. A heating mechanism is positioned adjacent the perforated flame holder. An inclined rotating kiln shell includes an upper end and a lower end and rotates around the stationary fuel nozzle and the perforated flame holder.

In one embodiment the heating mechanism applies heat to the perforated flame holder before the fuel nozzle outputs fuel onto the perforated flame holder. After the heating mechanism heats the perforated flame holder, the fuel nozzle outputs fuel onto the perforated flame holder. The elevated temperature of the perforated flame holder causes a combustion reaction of the fuel within the perforations of the flame holder. The combustion reaction is confined primarily to the immediate vicinity of the perforated flame holder.

According to an embodiment, the inclined rotating shell conveys a feedstock, reaction intermediates, and a calcined product along the inside of the inclined rotary shell from the upper end to the lower end, and outputs a calcined product at the lower end. The combustion reaction is substantially confined to the perforated flame holder. The perforated flame holder is designed and positioned to maintain a desired flame characteristic and/or a desired time vs. temperature profile in the reactants and products conveyed through the rotary kiln.

DETAILED DESCRIPTION

Figure 1:
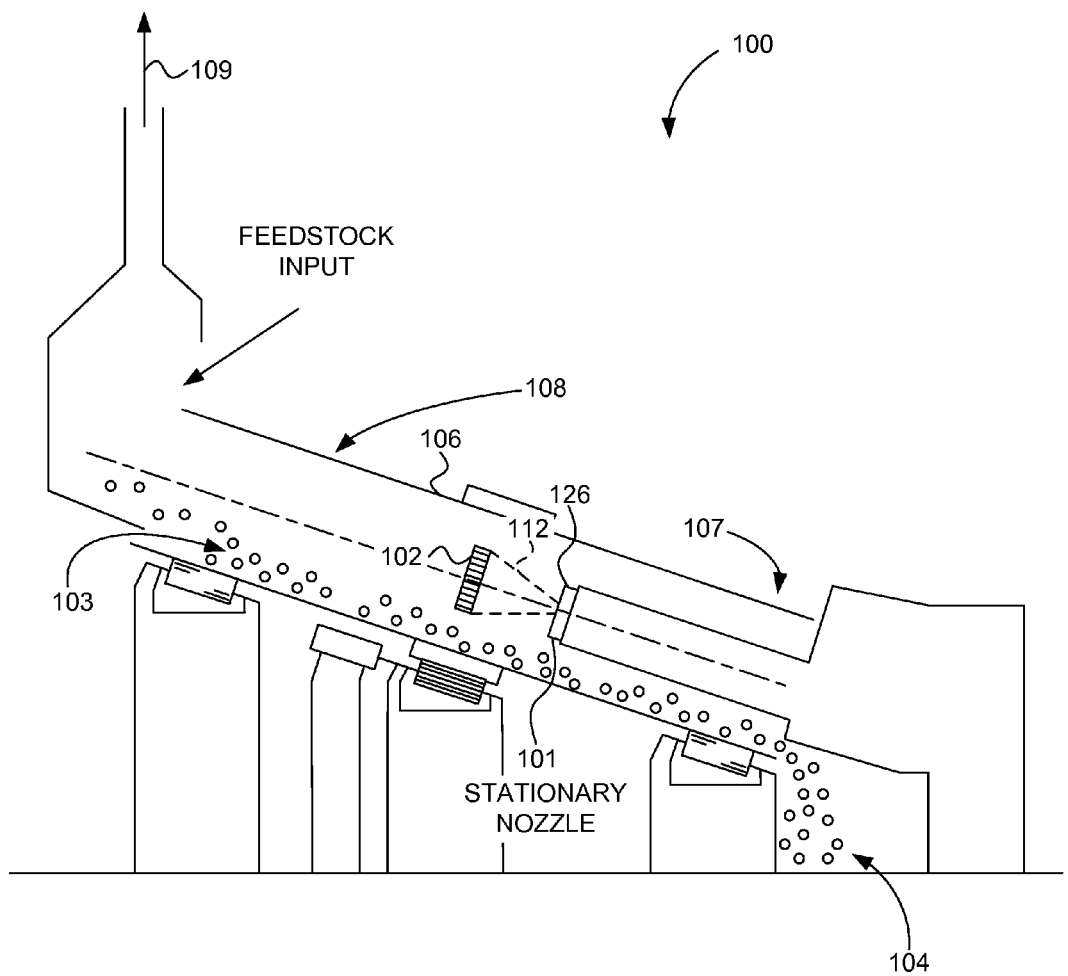
FIG. 1 is a diagram of a rotary kiln including a stationary fuel nozzle and a perforated flame holder, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a diagram of a rotary kiln 100 including a stationary fuel nozzle 101 and a perforated flame holder 102 spaced a selected distance from the stationary fuel nozzle 101. The perforated flame holder includes an input surface, an output surface, and a plurality of perforations extending between the input and output surfaces. The stationary fuel nozzle 101 is configured to output a fuel or a mixture of oxidant and fuel 112 to support a combustion reaction in a perforated flame holder 102, according to an embodiment. The fuel nozzle 101 can include one or more individual nozzles that each output fuel, oxidant, or a mixture of fuel and oxidant. An inclined rotary shell 106 has an upper end 108 and a lower end 107, and is configured to rotate around the stationary fuel nozzle 101 and the flame holder 102. The rotation of the inclined rotary shell 106 is configured to convey a process material 103 along a bottom portion of the cavity defined by the inclined rotary shell 106 from the upper end 108 to the lower end 107. The combustion reaction in the flame holder 102 provides thermal energy to the process material 103 during the transit of the process material 103. The applied thermal energy causes a change in the process material 103 to convert the process material 103 from an input material to a calcined product 104. The calcined product 104 is output at the lower end 107 of the inclined rotary shell 106. The change in the input material can include thermal decomposition, phase transition, or removal of volatile fractions from an ore or other solid material in the presence of air. One familiar calcined product 104 is Portland cement. In the production of Portland cement, the input material includes limestone (primarily calcium carbonate), and the calcined product 104 includes Portland cement clinker (primarily calcium oxide).

In one example, the flame holder 102 and the fuel nozzle 101 are positioned to maintain the quality of the calcined product 104, to provide immunity from changes in fuel, to compensate for changes in environment, and/or or to minimize of one or more components of a flue gas 109.

According to an embodiment, the inclined rotary shell 106 is electrically grounded. A feedstock introduction apparatus can be included at an upper end 108 of the inclined rotary shell 106. A calcined product 104 receiving apparatus can be included at the lower end 107 of the inclined rotary shell 106. The flame holder 102 can be mechanically coupled to the feedstock introduction apparatus and operatively coupled to the stationary fuel nozzle 101 and the combustion reaction along an axis of rotation of the inclined rotary shell 106 by electromagnetic interaction.

The configuration of the flame holder 102 and the fuel nozzle 101 can be configured to minimize or make substantially constant a time during which the process material 103 is subject to radiation heat transfer by causing the combustion reaction to occupy a small space (the perforated flame holder) proximate to the process flow.

Figure 2:
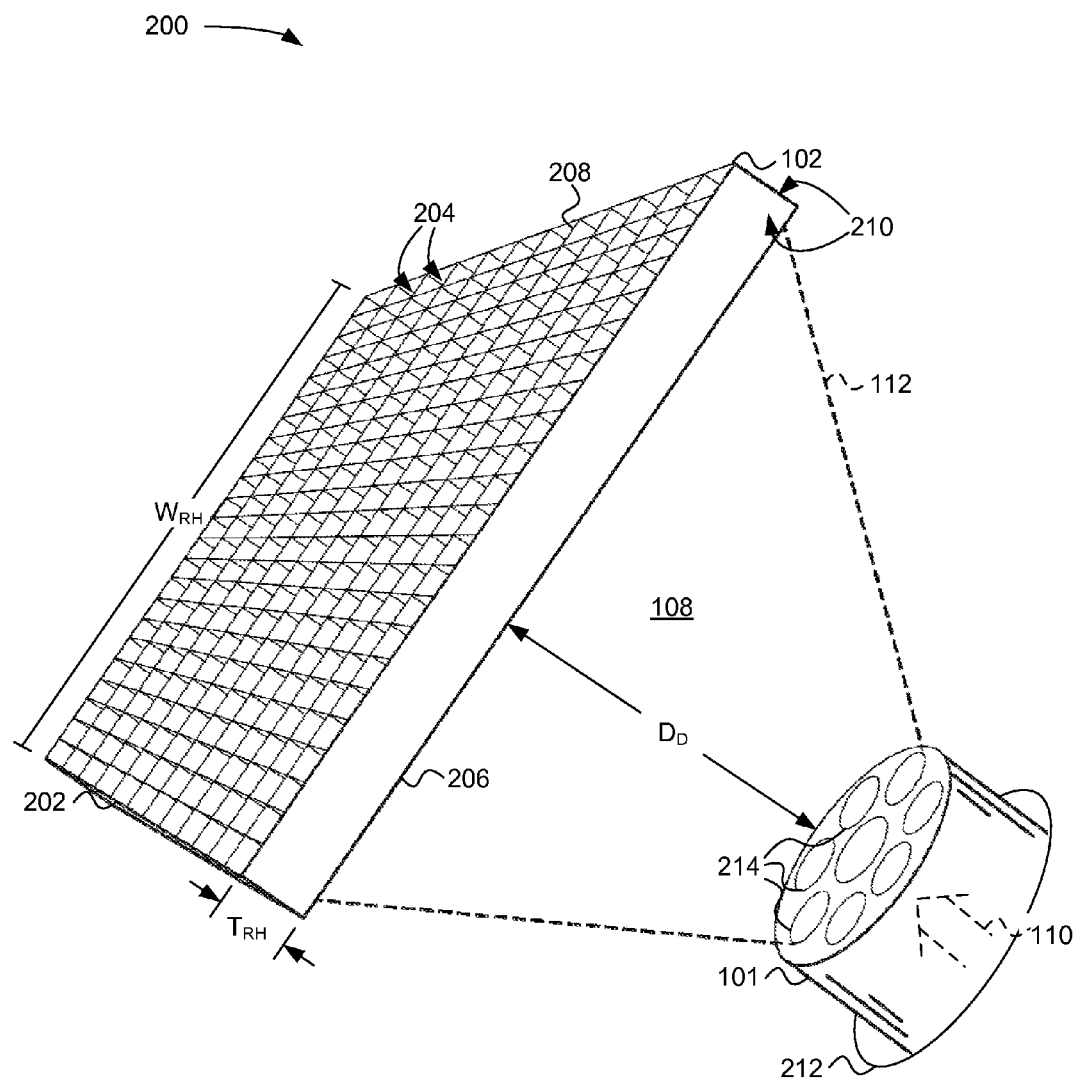
FIG. 2 is a perspective view of a stationary fuel nozzle and perforated flame holder of a rotary kiln including, according to an embodiment.

FIG. 2 is a simplified perspective view 200 of the flame holder 102 and the fuel nozzle 101 of FIG. 1, according to one embodiment. The stationary fuel nozzle 101 is disposed to output fuel and oxidant into a combustion volume to form a fuel and oxidant mixture 112. A perforated flame holder 102 is positioned a distance $D_D$ from the fuel nozzle 101. The perforated flame holder 102 includes a perforated flame holder body 202 defining a plurality of perforations 204 aligned to receive the fuel and oxidant mixture 112 from the fuel and oxidant source 110. The perforations 204 are configured to collectively hold a combustion reaction (e.g., see FIG. 3, 308) supported by the fuel and oxidant mixture 112.

The fuel can include a hydrocarbon gas or a vaporized hydrocarbon liquid, for example. The fuel can be a single species or can include a mixture of gases and vapors. For example in a process heater application, the fuel can include fuel gas or byproducts from the process that include carbon monoxide (CO), hydrogen ($H_2$), and methane ($CH_4$). In another application the fuel can include natural gas (mostly $CH_4$) or propane. In another application, the fuel can include #2 fuel oil or #6 fuel oil. Dual fuel applications and flexible fuel applications are similarly contemplated by the inventors. The oxidant can include oxygen carried by air and/or can include another oxidant, either pure or carried by a carrier gas.

Generally, the oxidation reaction held by the perforated flame holder 102 is indicative of a gas phase oxidation reaction. Other reactants and reactions may be substituted without departing from the spirit and scope of the disclosure.

According to an embodiment, the perforated flame holder body 202 can be bounded by an input surface 206 disposed to receive the fuel and oxidant mixture 112, an output surface 208 facing away from the fuel and oxidant source 110, and a peripheral surface 210 defining a lateral extent of the perforated flame holder 102. The plurality of perforations 204 defined by the perforated flame holder body 202 extend from the input surface 206 to the output surface 208.

According to an embodiment, the perforated flame holder 102 is configured to hold a majority of the combustion reaction within the perforations 204. For example, this means that more than half the molecules of fuel output into the combustion volume 108 by the fuel and oxidant source 110 are converted to combustion products between the input surface 206 and the output surface 208 of the perforated flame holder 102. According to an alternative interpretation, this means that more than half of the heat output by the combustion reaction is output between the input surface 206 and the output surface 208 of the perforated flame holder 102. Under nominal operating conditions, the perforations 204 can be configured to collectively hold at least 80% of the combustion reaction 308 (see FIG. 3) between the input surface 206 and the output surface 208 of the perforated flame holder 102. In some experiments, the inventors produced a combustion reaction that was wholly contained in the perforations between the input surface 206 and the output surface 208 of the perforated flame holder 102.

The perforated flame holder 102 can be configured to receive heat from the combustion reaction and output a portion of the received heat as thermal radiation 316 (see FIG. 3) to the process materials in the rotary kiln 100 (see FIG. 1). The perforated flame holder 102 outputs another portion of the received heat to the fuel and oxidant mixture 112 received at the input surface 206 of the perforated flame holder 102.

In this way, the perforated flame holder 102 acts as a heat source to maintain the combustion reaction, even under conditions where a combustion reaction would not be stable when supported from a conventional flame holder. This capability can be leveraged to support combustion using a leaner fuel to oxidant mixture than was previously feasible. Leaner combustion results in lower peak combustion temperature and reduces oxides of nitrogen (NOx) output. Moreover, the perforated flame holder 102 may act as a heat sink to cool hotter parts of the reaction to further minimize combustion temperature. Finally, substantial containment of the combustion reaction between the input surface 206 and the output surface 208 of the perforated flame holder 102 limits the time during which the combustion fluid (including molecular nitrogen, $N_2$, if the oxidant includes oxygen carried by air) is exposed to high temperature. The inventors believe this further limits NOx output.

Cooled flue gas 109 (see FIG. 1) is vented to the atmosphere through an exhaust flue. Optionally, the vented flue gas can pass through an economizer that pre-heats the combustion air, the fuel, and/or feed water.

The perforated flame holder 102 can have a width dimension $W_{RH}$ between opposite sides of the peripheral surface 210 at least twice a thickness dimension $T_{RH}$ between the input surface 206 and the output surface 208. In another embodiment, the perforated flame holder 102 can have a width dimension $W_{RH}$ between opposite sides of the peripheral surface 210 at least three times a thickness dimension $T_{RH}$ between the input surface 206 and the output surface 208. In another embodiment, the perforated flame holder 102 has a width dimension $W_{RH}$ between opposite sides of the peripheral surface 210 at least six times a thickness dimension $T_{RH}$ between the input surface 206 and the output surface 208. In another embodiment, the perforated flame holder 102 has a width dimension $W_{RH}$ between opposite sides of the peripheral surface 210 at least nine times a thickness dimension $T_{RH}$ between the input surface 206 and the output surface 208.

In an embodiment, the perforated flame holder 102 can have a width dimension $W_{RH}$ less than a width of the inclined rotating shell 106 (see FIG. 1). This can allow circulation of flue gas from above to below the perforated flame holder 102.

In an embodiment, the perforated flame holder 102 can be formed from a refractory material. In another embodiment, the perforated flame holder 102 can be formed from an aluminum silicate material. In another embodiment, the perforated flame holder 102 can be formed from mullite or cordierite.

The fuel and oxidant source 110 can further include a fuel nozzle 101 configured to output fuel and an oxidant source 212 configured to output a fluid including the oxidant. The fuel nozzle 101 can be configured to output pure fuel. The oxidant source 212 can be configured to output the fluid including the oxidant that includes no fuel. For example, the oxidant source 212 can be configured to output air carrying oxygen.

The fuel nozzle 101 can be configured to emit a fuel jet selected to entrain the oxidant to form the fuel and oxidant mixture 112 as the fuel jet and oxidant travel through a dilution distance $D_D$ between the fuel nozzle 101 and the perforated flame holder 102. Additionally or alternatively, the fuel nozzle 101 can be configured to emit a fuel jet selected to entrain the oxidant and to entrain flue gas as the fuel jet travels through a dilution distance $D_D$ between the fuel nozzle 101 and an input surface 206 of the perforated flame holder 102.

The perforated flame holder 102 can be disposed a distance $D_D$ away from the fuel nozzle 101. The fuel nozzle 101 can be configured to emit the fuel through a fuel orifice 214 having a dimension $D_O$. The perforated flame holder 102 can be disposed to receive the fuel and oxidant mixture 112 at a distance $D_D$ away from the fuel nozzle 101 greater than 20 times the fuel orifice 214 dimension $D_O$. In another embodiment, the perforated flame holder 102 is disposed to receive the fuel and oxidant mixture 112 at a distance $D_D$ away from the fuel nozzle 101 greater than or equal to 100 times the fuel orifice dimension $D_O$. In another embodiment the perforated flame holder 102 can be disposed to receive the fuel and oxidant mixture 112 at a distance $D_D$ away from the fuel nozzle 101 equal to about 245 times the fuel orifice dimension $D_O$.

The perforated flame holder 102 can include a single perforated flame holder body 202. In another embodiment, the perforated flame holder 102 can include a plurality of adjacent perforated flame holder sections The plurality of adjacent perforated flame holder bodies 202 can provide a tiled perforated flame holder 102.

The perforated flame holder 102 can further include a perforated flame holder tile support structure configured to support the plurality of perforated flame holder sections. The perforated flame holder tile support structure can include a metal superalloy. In another embodiment, the plurality of adjacent perforated flame holder sections can be joined with a fiber reinforced refractory cement.

Figure 3:
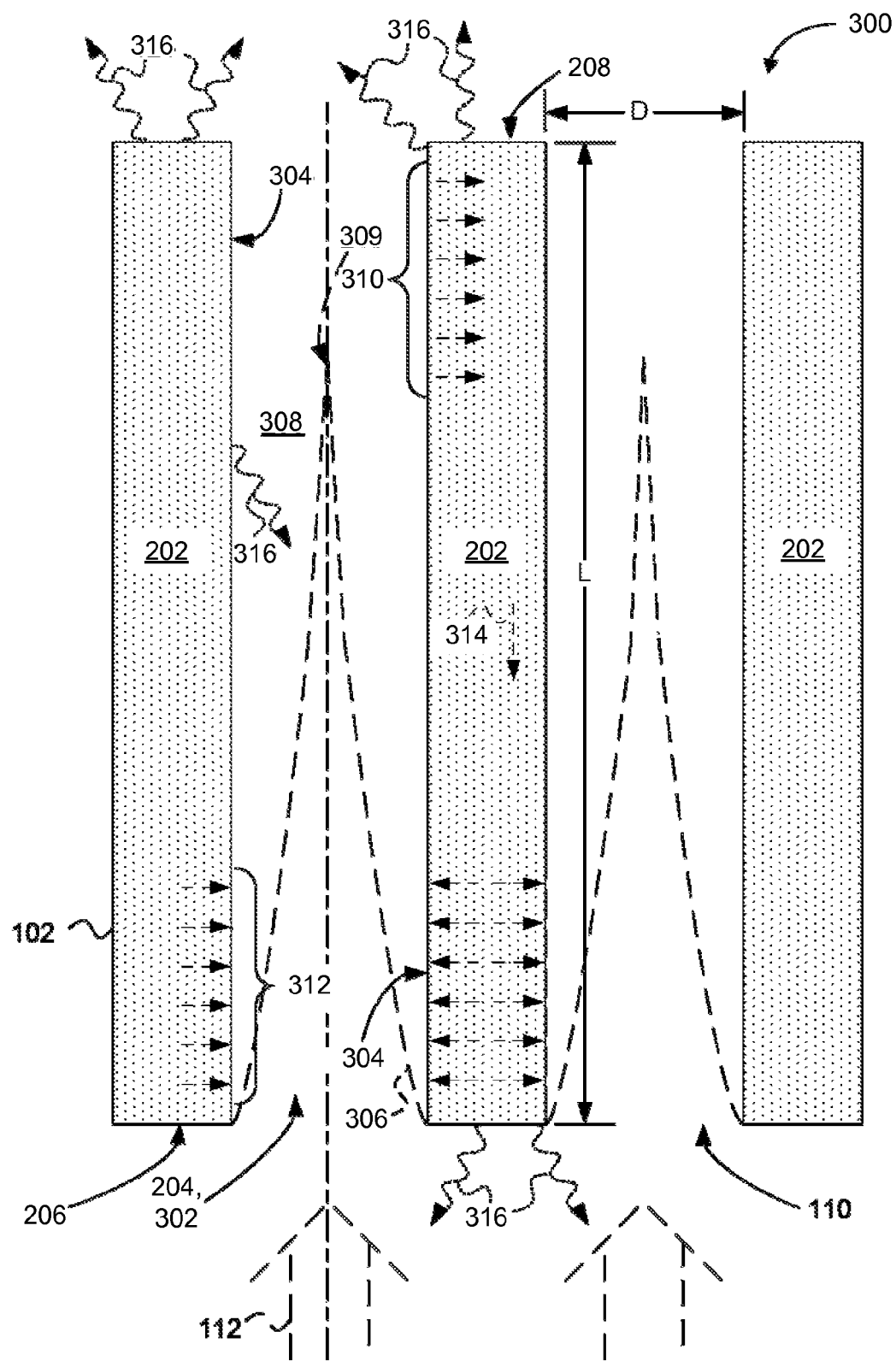
FIG. 3 is a cross sectional view of the perforated flame holder of FIG. 2, according to an embodiment.

FIG. 3 is side sectional diagram 300 of a portion of the perforated flame holder 102 of FIG. 2, according to an embodiment. In the embodiment 300 of FIG. 3, the perforated flame holder body 202 is continuous. That is, the body 202 is formed from a single piece of material. The embodiment 300 of FIG. 3 also illustrates perforations 204 that are non-branching. That is, the perforated flame holder body 202 defines perforations 204 that are separated from one another such that no flow crosses between perforations.

In an alternative embodiment the perforated flame holder body 202 defines perforations 204 that are non-normal to the input and output surfaces 206, 208. While this arrangement has an effect on gas trajectory exiting the output surface 208, the perforations operate similarly to those described in conjunction with FIG. 2.

Referring now to FIG. 3, the perforated flame holder body 202 defines a plurality of perforations 204 configured to convey the fuel and oxidant 112 and to hold the oxidation reaction 308 supported by the fuel and oxidant. The body 202 is configured to receive heat from the combustion reaction 308, hold the heat, and output the heat to the fuel and oxidant 112 entering the perforations 204. The perforations 204 can maintain a combustion reaction 308 of a leaner mixture of fuel and oxidant 112 than is maintained outside of the perforations 204.

The perforated flame holder 102 has an extent defined by an input surface 206 facing the fuel and oxidant source 110 and an output surface 208 facing away from the fuel and oxidant source 110. The perforated flame holder body 202 defines a plurality of perforations 204 that can be formed as a plurality of elongated apertures 302 extending from the input surface 206 to the output surface 208.

The perforated flame holder 102 receives heat from the oxidation reaction 308 and outputs sufficient heat to the fuel and oxidant mixture 112 to maintain the combustion reaction 308 in the perforations 204. The perforated flame holder 102 can also output a portion of the received heat as thermal radiation 316 to combustor walls 106 of the combustion volume 108. Each of the perforations 204 can bound a respective finite portion of the fuel combustion reaction 308.

In an embodiment, the plurality of perforations 204 are each characterized by a length L defined as a reaction fluid propagation path length between an input surface 206 and an output surface 208 of the perforated flame holder 102. The reaction fluid includes the fuel and oxidant mixture 112 (optionally including air, flue gas, and/or other "non-reactive" species, reaction intermediates (including transition states that characterize the combustion reaction), and reaction products.

The plurality of perforations 204 can be each characterized by a transverse dimension D between opposing perforation walls 304. The length L of each perforation 204 can be at least eight times the transverse dimension D of the perforation. In another embodiment, the length L can be at least twelve times the transverse dimension D. In another embodiment, the length L can be at least sixteen times the transverse dimension D. In another embodiment, the length L can be at least twenty-four times the transverse dimension D. The length L can be sufficiently long for thermal boundary layers 306 formed adjacent to the perforation walls 304 in a reaction fluid flowing through the perforations 204 to converge within the perforations 204, for example.

According to an embodiment, the perforated flame holder 102 can be configured to cause the fuel combustion reaction 308 to occur within thermal boundary layers 306 formed adjacent to perforation walls 304 of the perforations 204. As relatively cool fuel and oxidant 112 approach the input surface 206, the flow is split into portions that respectively travel through individual perforations 204. The hot perforated flame holder body 202 transfers heat to the fluid, notably within thermal boundary layer 306 that progressively thicken as more and more heat is transferred to the incoming fuel and oxidant 112. After reaching a combustion temperature, the reactants flow while a chemical ignition delay time elapses, after which the combustion reaction occurs. Accordingly, the combustion reaction 308 is shown as occurring within the thermal boundary layers 306. As flow progresses, the thermal boundary layers merge at a point 309. Ideally, the point 309 lies between the input surface 206 and output surface 208. At some point, the combustion reaction 308 causes the flowing gas (and plasma) to output more heat than it receives from the body 202. The received heat (from a region 310 is carried to a region nearer to the input surface 206, where the heat recycles into the cool reactants.

The perforations 204 can include elongated squares, each of the elongated squares has a transverse dimension D between opposing sides of the squares. In another embodiment, the perforations 204 can include elongated hexagons, each of the elongated hexagons has a transverse dimension D between opposing sides of the hexagons. In another embodiment, the perforations 204 can include hollow cylinders, each of the hollow cylinders has a transverse dimension D corresponding to a diameter of the cylinders. In another embodiment, the perforations 204 can include truncated cones, each of the truncated cones has a transverse dimension D that is rotationally symmetrical about a length axis that extends from the input surface 206 to the output surface 208. The perforations 204 can each have a lateral dimension D equal to or greater than a quenching distance of the fuel.

In one range of embodiments, the plurality of perforations have a lateral dimension D between 0.05 inch and 1.0 inch. Preferably, the plurality of perforations have a lateral dimension D between 0.1 inch and 0.5 inch. For example the plurality of perforations can have a lateral dimension D of about 0.2 to 0.4 inch.

The perforated flame holder body 202 can include a refractory material. The perforated flame holder body 202 can include a metal superalloy, for example, or the perforated flame holder body can be formed from a refractory material such as cordierite or mullite, for example. The perforated flame holder body 202 can define a honeycomb.

The perforations 204 can be parallel to one another and normal to the input and output surfaces 206, 208. In another embodiment, the perforations 204 can be parallel to one another and formed at an angle relative to the input and output surfaces 206, 208. In another embodiment, the perforations 204 can be non-parallel to one another. In another embodiment, the perforations 204 can be non-parallel to one another and non-intersecting.

Referring still to FIG. 3, the perforated flame holder body 202 defining the perforations 204 can be configured to receive heat from the (exothermic) combustion reaction 308 at least in second regions 310 of perforation walls 304. (e.g., near the output surface 208 of the perforated flame holder 102). The perforated flame holder body 202 defining the perforations 204 can be characterized by a heat capacity. The perforated flame holder body 202 can be configured to hold heat from the combustion fuel reaction in an amount corresponding to the heat capacity.

The perforated flame holder body 202 can be configured to transfer heat from the heat-receiving regions 310 to heat output regions 312 of the perforation walls 304. (e.g., wherein the heat-output regions 312 are near the input surface 206 of the perforated flame holder 102). For example, the perforated flame holder body 202 can be configured to transfer heat from the heat receiving regions 310 to the heat-output regions 312 of the perforation walls 304 via thermal radiation 316. Additionally or alternatively, the body 202 can be configured to transfer heat from the heat-receiving regions 310 to the heat-output regions 312 of the perforation walls 304 via a heat conduction path 314.

The perforated flame holder body 202 can be configured to output heat to the boundary layers 306 at least in heat-output regions 312 of perforation walls 304 (e.g., near the input surface 206 of the perforated flame holder 102). Additionally or alternatively, the body 202 can be configured to output heat to the fuel and oxidant mixture 112 at least in heat-output regions 312 of perforation walls 304 (e.g., near the input surface 206 of the perforated flame holder 102). wherein the perforated flame holder body 202 is configured to convey heat between adjacent perforations 204. The heat conveyed between adjacent perforations can be selected to cause heat output from the combustion reaction portion 308 in a perforation to supply heat to stabilize a combustion reaction portion 308 in an adjacent perforation 204.

The perforated flame holder body 202 can be configured to receive heat from the fuel combustion reaction 308 and output thermal radiated heat energy 316 to maintain a temperature of the perforated flame holder body 202 below an adiabatic flame temperature of the fuel combustion reaction 308. Additionally or alternatively, the body can be configured to receive heat from the fuel combustion reaction 308 to cool the fuel combustion reaction 308 to a temperature below a NOx formation temperature.

The plurality of perforations 204 can include a plurality of elongated squares. In another embodiment, the plurality of perforations 204 can include a plurality of elongated hexagons.

Honeycomb shapes used in the perforated flame holder 102 can be formed from VERSAGRID® ceramic honeycomb, available from Applied Ceramics, Inc. of Doraville, S.C.

As described above, FIG. 3 illustrates an embodiment 300 wherein the perforated flame holder body 202 is continuous. A continuous reaction holder body 202 is, within any one section, a single piece that is extruded, drilled, or otherwise formed to define the plurality of perforations 204. However, in one embodiment the perforated flame holder body 202 is discontinuous. A discontinuous reaction holder body 202 is formed from a plurality of pieces of material. In the embodiment, the plurality of pieces of material comprise planar pieces that are stacked to form the reaction holder body. The embodiments operate substantially identically in that the individual stacked pieces are intimately contacting and form perforations 204 that are separated from one another.

Figure 4:
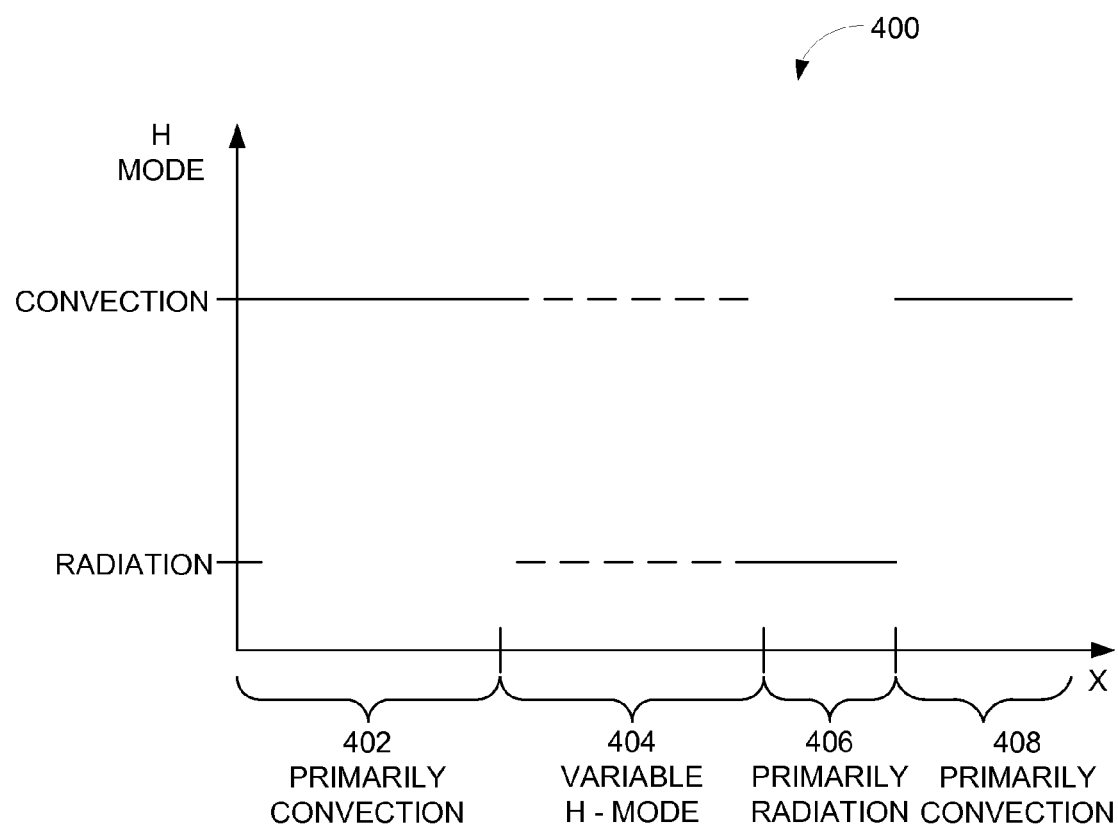
FIG. 4 is a diagram of a variation in heating modes with distance that may characterize prior art flame process heating applications, according to an embodiment.

FIG. 4 is a diagram 400 of a variation in heating modes between radiation and convection that may characterize prior art flame process heating applications. The vertical axis depicts a mode of heat transfer, which in the depiction is simplified to either radiation or convection. In actual practice, heat transfer may generally be a mixture of radiation, convection, and conduction; however, the indicated simplification is useful for understanding a shortcoming of the prior art. The x-axis corresponds to distance x from a process material entry point, which may be presumed to be coincident with the graph origin. As shown in FIG. 1, the process material 103 passing along the inside of the inclined rotary shell 106 receives primarily convective heating in a first region 402. In the first region 402, the combustion reaction is substantially never present and most or substantially all heating is via convection heating. Typically, the volume inside the inclined rotary shell 106 is considered to be heated flue gas from the combustion reaction. In a second region 404 farther down the inclined rotary shell 106, the process material 103 can intermittently receive radiation heating and convection heating. Radiation heating and convection heating are referred to as "H-modes." The second region 404 is characterized by flame flicker or vortex shedding where sometimes the combustion reaction radiates to the process material 103 and at other times is not present, during which heating is dominated by convection. Next, at a region 406, farther down the rotary shell 106, the combustion reaction is understood to be momentum driven and/or can be steady, such that the process material 103 receives radiation heating from the combustion reaction. Finally, at a more distal region 408, which can for example correspond to the region shown in FIG. 1 corresponding to the stationary fuel nozzle 101 but beyond the base of the combustion reaction, heat conduction is primarily by convection. The convection in the region 408 can, in some embodiments, be primarily convection from the heated process material to cooling air entering the lower end 107 of the inclined rotating shell 106.

In continuous flow processes where it is desired to subject all of the process material 103 to uniform and consistent convective heating from the combustion reaction, variations in heating modes, such as that found in second region 404 or radiation heating, such as that corresponding to region 406, can be undesirable.

According to embodiments, a solution to the shortcomings of the prior art may be to confine the combustion reaction into a relatively small or at least a constant region to minimize variable radiation/convective heating of the process material 103. By confining the combustion reaction, the convection heating zone of the first region 402 (which may provide substantially constant heat flux) can be maximized. According to other embodiments, the variable heating of the second region 404 as described in conjunction with FIG. 4 can be minimized and/or substantially eliminated. According to other embodiments, the distance (and time) over which radiation is received in region 406 can be minimized.

Figure 5:
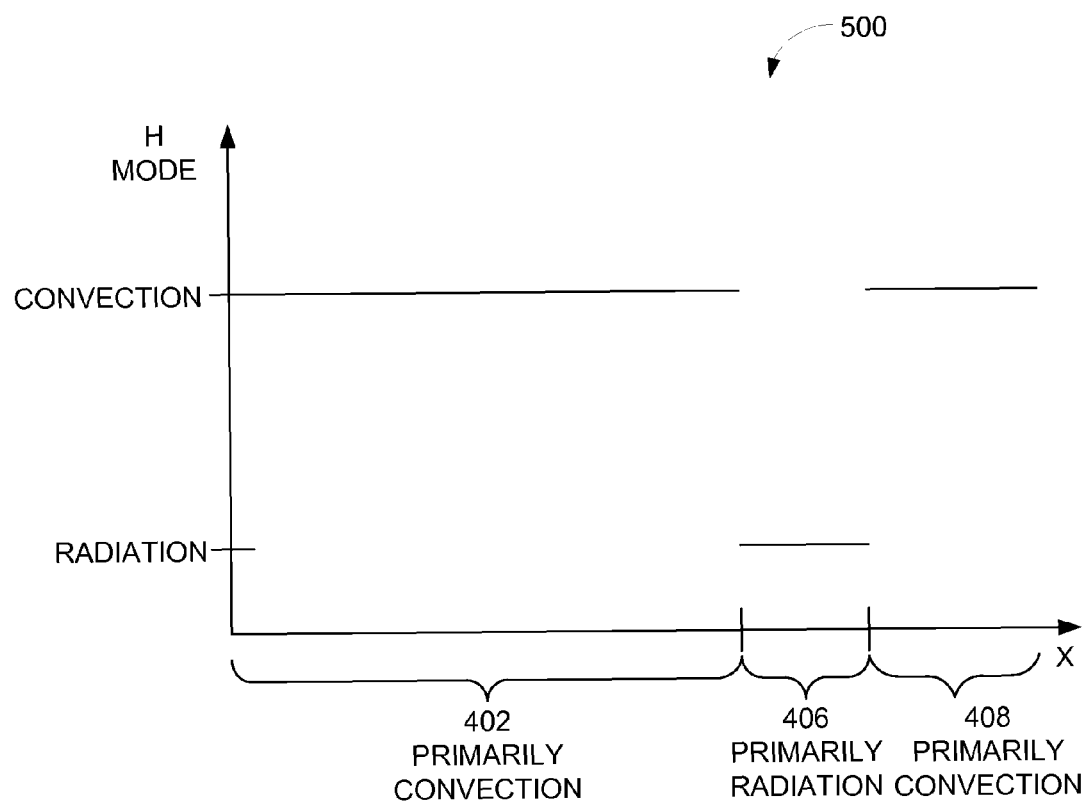
FIG. 5 is a diagram of a variation in heating modes with distance that may characterize a rotary kiln burner including a perforated flame holder, according to an embodiment.

FIG. 5 is a diagram 500 of process material heating modes in a rotary kiln, according to embodiments. In contrast with the situation shown in FIG. 4, FIG. 5 illustrates more controlled and/or more repeatable heating of the process material that may be achieved according to embodiments. The vertical axis depicts a mode of heat transfer, which in the depiction is simplified to either radiation or convection. Radiation heating and convection heating is referred to as "H-modes." In embodiments, heat transfer is generally a mixture of radiation, convection, and conduction; however, the indicated simplification is useful for understanding a contrast with the prior art. The x-axis corresponds to distance x from a process material entry point, which is presumed to be coincident with the graph origin.

According to an embodiment, as shown in FIG. 5, the process material passing along the inside of the inclined rotary shell 106 receives primarily convective heating in a first region 402. In the first region 402, the combustion reaction is substantially never present and most or substantially all heating may be via convection heating. Typically, the volume inside the inclined rotary shell 106 of FIG. 1 corresponding to the first region 402 is considered to be heated flue gas from the combustion reaction. It may be noted that, according to an embodiment graphically depicted in FIG. 5, the region of variable heating 404 shown in FIG. 4, is substantially absent. In other embodiments, the combustion reaction is shaped such that the convective region 402 extends at least partially into the region 406 formerly dominated by radiation heating.

According to an embodiment, a second region 406 farther down the inclined rotary shell 106 corresponds to a region of flame confinement, or "squish," wherein substantially the entire (emissive portion of the) combustion process occurs in a limited volume. As will be appreciated, the combustion reaction within the perforated flame holder 102 provides the illustrated confinement. In the second region 406, the process material receives significant radiation heating. In some embodiments, radiation heating can form the dominant heat transfer mode (or H-mode) in the region 406. In some embodiments, substantially all the heat transfer in the region 406 is associated with radiation heat transfer.

After passing the region 406, the process material enters a third region 408, according to an embodiment. For example, the third region 408 corresponds to the region shown in FIG. 1 corresponding to the stationary fuel nozzle 101 but beyond the base of the combustion reaction, heat transfer in the third region 408 is primarily by convection. The convection in the third region 408 is, in some embodiments, primarily convection from the heated process material to cooling air entering the lower end 107 of the inclined rotating shell 106.

In contrast to the situation depicted in FIG. 4, the second region 404, which may be characterized by flame flicker or vortex shedding where sometimes the flame radiates to the process material and at other times is not present, is substantially absent. It is understood that such behavior can be observed at the transition between regions 402 and 406 and/or between regions 406 and 408, but these transitions are considered sufficiently short in distance and duration that the effects of variable H-mode are ignored.

Figure 6:
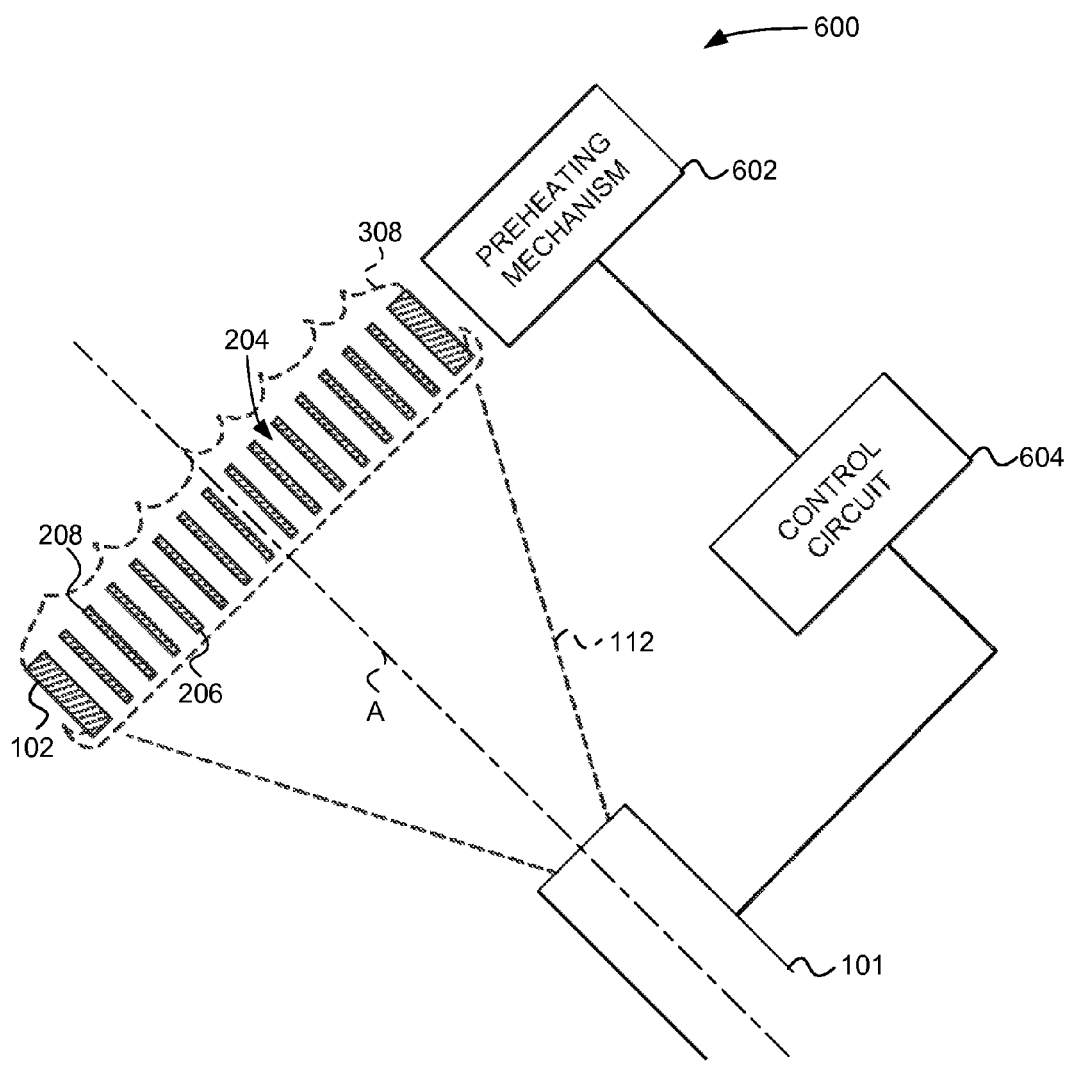
FIG. 6 is a block diagram of a burner assembly for a rotary kiln including a perforated flame holder and a preheating mechanism, according to an embodiment.

FIG. 6 is a block diagram a portion of rotary kiln 600. The rotary kiln 600 of FIG. 6 is substantially similar to the embodiment 200 of FIG. 2. The embodiment of FIG. 6 further includes a preheating mechanism 602 positioned adjacent the perforated flame holder 102. The preheating mechanism 602 is electrically coupled to a control circuit 604.

The preheating mechanism 602 is configured to preheat the perforated flame holder 102 prior to outputting fuel from the nozzle 101 onto the perforated flame holder 102. In particular, in preparation for initiating a combustion reaction of the fuel 112 in the perforated flame holder 102, fuel 112 is appreciated to a threshold temperature. The threshold temperature selected such that when the perforated flame holder 102 is heated to a threshold temperature, the combustion reaction 308 of the fuel spontaneously begins when the fuel 112 contacts the perforated flame holder 102. Heat from the combustion reaction 308 further increases the temperature of the flame holder 102. In this manner a self-sustaining combustion reaction can be initiated by merely preheating the flame holder 102 to a threshold temperature and then outputting the fuel 112 onto the flame holder 102.

In one embodiment the preheating mechanism 602 includes the nozzle 101, wherein the nozzle 101 is an adjustable nozzle. A temperature sensor is positioned adjacent the flame holder 102.

In a startup mode the adjustable fuel nozzle 101 is it is extended, i.e., startup position, in which the distance between the nozzle 101 and the flame holder 102 is significantly reduced as compared to when the nozzle is fully retracted. Additionally, the control circuit 604 controls the fuel control valve to reduce the volume and velocity of the fuel stream 112 ejected by the nozzle 101. Because the velocity of the fuel stream 112 is reduced, a stable startup flame can be supported by the nozzle 101, alone, in a position between the nozzle and the flame holder 102. By moving the nozzle 101 to the extended position, the startup flame is positioned close to the flame holder 102, and is thus able to quickly heat a portion of the flame holder 102 to a temperature that exceeds a threshold defining a minimum startup temperature (i.e., the startup temperature threshold) of the flame holder 102. When the signal from the temperature sensor indicates that the temperature of the flame holder 102 is above the threshold, the system control circuit 604 controls the nozzle position controller to move the nozzle 101 to the retracted, operational position, and controls the fuel control valve to open further, increasing the fuel flow to an operational level. As the velocity of the fuel stream 112 increases, the startup flame is blown out. As the uncombusted fuel mixture reaches the flame holder 102, the mixture auto-ignites, at least within the portion of the flame holder 102 that has been heated beyond the startup threshold. Very quickly thereafter, the entire flame holder 102 is heated to its operating temperature, and continues in normal operation thereafter.

According to another embodiment, the system control circuit 604 includes a timer by which transition from startup mode to operational mode is controlled; i.e., when startup is initiated, the system control circuit 604 starts the timer, and when a selected time period has passed, the nozzle 101 is retracted and the fuel flow is increased, as described above. The time period is selected according to a predetermined period necessary to ensure that the flame holder 102 has reached the startup temperature threshold.

The movable nozzle 101 can also be employed in combustion systems that may be required to operate on a variety of fuels. As is well known in the art, the fuel-to-air ratio at which the mixture is combustible varies according to the type of fuel, as does flame propagation speed within a flow of fuel. Thus, an optimal operating distance will vary according to the type of fuel. The rotary kiln can accommodate changes in fuel type by adjustment of the position of the nozzle 101 relative to the flame holder 102. The adjustment can be made by direct manual control of the nozzle 101, or the system control circuit 604 can be programmed to make the adjustment automatically. For example, additional sensors can be positioned to detect emission levels of flames propagating within the fuel stream 112, incomplete combustion, etc., in response to which the system control unit can be programmed to modify the position of the nozzle 101 and/or the fuel flow by adjustment of the fuel control valve, to bring the operation of the system closer to an optimum or desired level.

In one embodiment the preheating mechanism includes a first electrode and second electrode (which functions as a heating apparatus), both operatively coupled to a voltage supply. A control circuit 604 is coupled to the voltage supply and a temperature sensor.

The first electrode is in the shape of a torus, positioned just downstream of the nozzle 101 and centered on the longitudinal axis A of the nozzle so that the fuel stream 112 passes through the first electrode. The second electrode is positioned between the input end 206 of the flame holder 102 and the nozzle 101. The second electrode is movable from an extended position, to a retracted position, shown in phantom lines. The control circuit 604 is configured to extend and retract the second electrode. In the extended position, the second electrode extends to a position close to or intersecting the longitudinal axis A. In the retracted position, the second electrode is spaced away from contact with the fuel stream 112 or a flame supported thereby. According to an embodiment, a temperature sensor is provided, as previously described.

In operation, when the rotary kiln is in startup mode, i.e., when startup is initiated, the control circuit 604 controls the electrode position control to move the second electrode to the extended position. The control circuit 604 controls the voltage supply to transmit a first voltage signal to the first electrode. As the fuel stream 112 passes through the first electrode, an electrical charge having a first polarity is imparted to the fuel stream. Meanwhile, the control circuit 604 transmits a second voltage signal from the voltage supply to the second electrode. The second voltage signal has a polarity that is opposite that of the charge imparted to the fuel stream, and therefore attracts the oppositely-charged fuel stream. Ignition is initiated within the fuel stream 112, whereupon a startup flame is held between the first and second electrodes, in spite of the high velocity of the fuel stream. This method of holding a flame within a fuel flow is sometimes referred to as electrodynamic combustion control.

According to an embodiment, the control circuit 604 controls the voltage supply to apply a voltage signal to the second electrode while connecting the first electrode to ground. According to an embodiment, the voltage signal applied to the first and/or second electrode is an AC signal.

With the startup flame held below the input surface 206 of the flame holder 102, a portion of the flame holder 102 is quickly heated to the startup temperature threshold. When the startup temperature threshold is surpassed, the control circuit 604 controls the voltage supply to remove the voltage signals from the first and second electrodes, and controls the electrode position controller to move the second electrode to the retracted position. When the voltage signals are removed from the electrodes, the startup flame is no longer held, and blows out. As previously described, when the uncombusted fuel and air mixture reaches the flame holder 102, the primary flame auto-ignites in the preheated portions of the flame holder 102, and normal operation quickly follows.

Although embodiments are described as including a system control circuit 604 that is configured to control transition between a startup mode and an operational mode, alternative embodiments are operated manually. For example, according to an embodiment, the rotary kiln is configured such that an operator manually switches the electrode position controller to move the second electrode. According to another embodiment, the operator manually extends and retracts the second electrode. Additionally, according to an embodiment, an operator manually switches a voltage signal to the first and second electrodes, and switches the signals off when the flame holder 102 exceeds the startup threshold.

In one embodiment the preheating mechanism 602 includes a secondary nozzle positioned between the primary nozzle 101 and the flame holder 102. The fuel supply is coupled to the primary nozzle 101 and the secondary nozzle via fuel lines. A primary fuel valve controls a flow of fuel from the fuel supply to the primary nozzle 101, and a secondary fuel valve controls a flow of fuel from the fuel supply to the secondary nozzle. The system control circuit 604 is operatively coupled to the primary and secondary fuel valves via connectors.

In operation, when startup is initiated, the system control circuit 604 controls the secondary fuel valve to open—the primary fuel valve is closed—and ignites a stream of fuel that exits the secondary nozzle, producing a startup flame that is directly adjacent to the input surface 206 of the flame holder 102. The startup flame heats a portion of the flame holder 102 to a temperature exceeding the startup threshold. When the system control circuit 604 determines that a portion of the flame holder 102 exceeds the startup temperature threshold—via, for example, a signal from a temperature sensor, as described previously—the system control circuit 604 controls the secondary fuel valve to close, while controlling the primary fuel control valve to open, causing a fuel stream 112 to be ejected by the primary nozzle 101. When the fuel and air mixture of the fuel stream 112 reaches the flame holder 102, a primary flame is ignited and normal operation follows, substantially as described with reference to previously embodiments.

In one embodiment the preheating mechanism 602 includes an electrically resistive heating element. In the embodiment shown, the preheating mechanism 602 is in the form of a wire that is interleaved in and out through some of the plurality of perforations 204. The preheating mechanism 602 is operatively coupled to a voltage supply. During a startup procedure, the system control circuit 604 controls the voltage supply to apply a voltage potential across the ends of the preheating mechanism 602. The resistance value of the preheating mechanism 602 and the magnitude of the voltage potential are selected to generate sufficient heat to raise the temperature of the portion of the flame holder 102 in the vicinity of the heating element to beyond the startup threshold within a few seconds, after which the system control unit circuit controls a fuel valve to open, while controlling the voltage supply to remove the voltage potential from the preheating mechanism 602. When the fuel stream 112 contacts the heated portion of the flame holder 102, auto-ignition occurs, and a stable flame is established in the flame holder 102.

In one embodiment the preheating mechanism 602 includes a laser emitter positioned and configured to emit a laser beam that impinges in a portion of the input surface 206 of a flame holder 102. Photonic energy delivered by the laser beam is converted into thermal energy within the flame holder 102, thereby heating a portion of the flame holder 102. When the portion of the flame holder 102 exceeds the startup temperature threshold, fuel is sent to a nozzle 101 and ejected into a fuel stream toward the flame holder 102, and the laser is shut down. In the embodiment shown, the laser is held in a fixed position that is sufficiently removed from the flame holder 102 and fuel stream 112 as to cause no interference with normal operation of the system, and to be substantially unaffected by the environment. According to another embodiment, the laser emitter is positioned much closer to the input surface 206 of the flame holder 102 for more efficient energy transfer. Accordingly, the laser can also be retracted from the vicinity of the fuel stream when the system is not in startup mode.

In one embodiment the laser emitter is configured to transmit energy in a non-thermal form, which is converted to thermal energy upon impinging on the flame holder 102. According to various embodiments, other devices are configured to transmit non-thermal energy onto the flame holder 102 to be converted to thermal energy. For example, according to an embodiment, a microwave transmitter is positioned and configured to direct a microwave emission onto a surface of the flame holder 102. In that embodiment, the flame holder 102 includes a patch of material that is configured to absorb the microwave emission and to convert a portion of the transmitted energy to heat.

Figure 7:
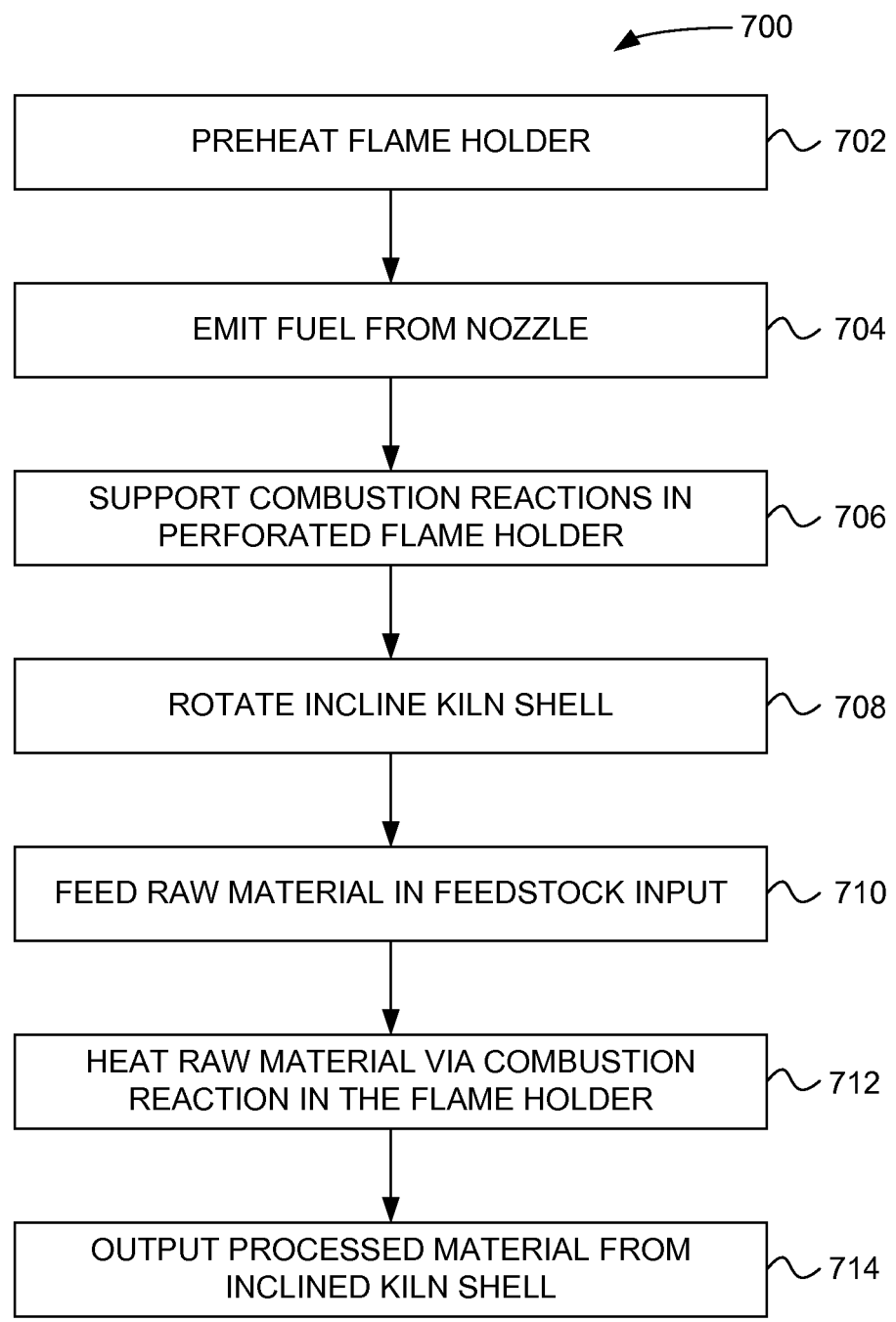
FIG. 7 is a flow chart showing a method for heating a process material in a rotary kiln including one or more electrodes, according to an embodiment.

FIG. 7 is a flow diagram of a process for operating a rotary kiln including a perforated flame holder according to one embodiment. At 702 the perforated flame holder is preheated to a threshold temperature at which a combustion reaction of the fuel mixture can occur spontaneously. When the perforated flame holder reaches a threshold temperature, at 704 fuel is emitted from a fuel nozzle. The perforated flame holder is positioned a selected distance from the fuel nozzle such that the fuel expelled from the fuel nozzle contacts the perforated flame holder. Because the perforated flame holder has been preheated to the threshold temperature, the fuel begins to combust upon contacting the preheated flame holder. As fuel from the down fired fuel nozzle continues to enter the perforations of the flame holder, the combustion reaction continues. At 706, the combustion reaction is supported primarily in the perforations of the perforated flame holder. This causes the perforated flame holder to continue to increase in temperature. At 708 an inclined rotating shell of the rotary kiln begins to rotate around the fuel nozzle and the flame holder. At 710 raw material is fed into a feedstock input of the rotary kiln. At 712, as the flame holder increases in temperature heat is radiated from the flame holder to raw material. The raw material absorbs the heat and a processed material is produced from the raw material. At 714 processed material is output from the inclined rotating shell.

In one embodiment, the process includes measuring the temperature of the flame holder and emitting the down-fired fuel from the fuel nozzle only after the measured temperature of the flame holder has passed the threshold temperature.

In one embodiment the perforated flame holder is preheated by preheating mechanism positioned adjacent the perforated flame holder. Preheating mechanism can include a laser that irradiates the flame holder with a high-intensity laser beam until at least a portion of the flame holder has reached the threshold temperature. Alternatively, the preheating mechanism can be a second burner that generates a flame adjacent flame holder thereby heating the flame holder to the threshold temperature before outputting fuel from the nozzle.

According to one embodiment, the preheating mechanism can also be an electrical resistor coupled to the perforated flame holder. A current is passed through the resistor, thereby generating heat. Because the perforated flame holder is in contact with the resistor, the perforated flame holder heats up while the current is passed through the resistor.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method comprising:
   heating a flame holder having a plurality of perforations each extending from an input surface of the flame holder to an output surface of the flame holder;
   outputting fuel and oxidant from a first nozzle onto the input surface of the flame holder;
   supporting a combustion reaction of the fuel and oxidant in the plurality of perforations; and
   rotating an inclined kiln shell around the first nozzle and the flame holder.

2. The method of claim 1, comprising:
   passing a process material into an upper opening of the rotating inclined kiln shell, past the flame holder, to a lower opening of the inclined kiln shell; and
   heating the process material within the rotating kiln shell by radiating heat from the flame holder to the process material.

3. The method of claim 2, comprising:
   measuring a temperature of the flame holder; and
   outputting the fuel and oxidant onto the flame holder after the temperature of the flame holder has reached a threshold temperature.

4. The method of claim 3, wherein the threshold temperature is a temperature at which the combustion reaction will ignite in the flame holder.

5. The method of claim 2, wherein heating the flame holder comprises applying heat to the flame holder by a preheating mechanism positioned adjacent the flame holder.

6. The method of claim 2, comprising heating the flame holder by irradiating the flame holder with a laser.

7. The method of claim 2, comprising heating the flame holder by supporting a flame adjacent to the flame holder with a second fuel nozzle positioned adjacent the flame holder.

8. The method of claim 2, comprising heating the flame holder by passing a current through an electrical resistor coupled to the flame holder.

9. The method of claim 2, comprising outputting oxidant from a third nozzle onto the first surface of the flame holder.

10. The method of claim 9, comprising outputting the oxidant in an airstream.

11. The method of claim 9, wherein the combustion reaction is a reaction of the fuel with the oxidant.

12. The method of claim 2, wherein the flame holder is of a refractory material.

13. The method of claim 2, wherein the perforations are isolated from each other by a body of the flame holder.

14. The method of claim 2, comprising supporting the flame holder in a substantially fixed relationship with respect to the fuel nozzle.

15. A high consistency calcine material made by a process, the process comprising:
 inputting a stream of raw material to a rotating process vessel;
 maintaining a combustion reaction within a perforated flame holder spaced apart from a fuel nozzle and including an input surface facing the fuel nozzle, an output surface opposite the flame holder, and a plurality of perforations extending from the input surface to the output surface, the fuel nozzle configured to output fuel onto the flame holder; and
 heating the raw material, an intermediate product reacted from the raw material, and the high consistency calcine material made from the intermediate product by radiating heat from the flame holder.

16. The high consistency calcine material made by a process of claim 15, wherein the high consistency calcine product includes Portland cement.

17. The high consistency calcine material made by a process of claim 15, wherein the high consistency calcine product includes dehydrated titanium oxide.

18. The high consistency calcine material made by a process of claim 15, wherein the high consistency calcine product includes a dried solid fuel.

* * * * *